United States Patent
Shudark et al.

(10) Patent No.: US 10,231,238 B2
(45) Date of Patent: Mar. 12, 2019

(54) FORMING A TIME SYNCHRONIZED CHANNEL HOPPING NETWORK USING GUARANTEED TIME SLOTS

(71) Applicant: LANDIS+GYR INNOVATIONS, INC., Alpharetta, GA (US)

(72) Inventors: Jeff B. Shudark, Cumming, GA (US); Chris Calvert, Roswell, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 134 days.

(21) Appl. No.: 15/585,711

(22) Filed: May 3, 2017

(65) Prior Publication Data

US 2017/0325224 A1   Nov. 9, 2017

Related U.S. Application Data

(60) Provisional application No. 62/330,977, filed on May 3, 2016.

(51) Int. Cl.
*H04W 72/04* (2009.01)
*H04B 1/7156* (2011.01)
(Continued)

(52) U.S. Cl.
CPC ...... *H04W 72/0446* (2013.01); *H04B 1/7156* (2013.01); *H04W 72/042* (2013.01);
(Continued)

(58) Field of Classification Search
CPC ............. H04W 72/0446; H04W 74/04; H04W 72/042; H04W 84/18; H04B 1/7156; H04B 2001/71563
See application file for complete search history.

(56) References Cited

U.S. PATENT DOCUMENTS

| 2004/0013127 A1* | 1/2004 | Shvodian | H04W 74/02 370/442 |
|---|---|---|---|
| 2006/0067280 A1 | 3/2006 | Howard et al. | |

(Continued)

FOREIGN PATENT DOCUMENTS

WO    2017192703    11/2017

OTHER PUBLICATIONS

PCT/US2017/030812, "International Search Report and Written Opinion", dated Sep. 6, 2017, 11 pages.

*Primary Examiner* — Kwang B Yao
*Assistant Examiner* — Moo Jeong
(74) *Attorney, Agent, or Firm* — Kilpatrick Townsend & Stockton LLP

(57) ABSTRACT

A network coordinator in a time-slotted channel hopping ("TSCH") network can include a processing device and a memory on which instructions are stored for causing the processing device to (i) determine a first guaranteed time slot in a first occurrence of a hopping pattern is unassigned to any TSCH node of a plurality of TSCH nodes in the TSCH network; (ii) transmit a beacon during the first guaranteed time slot in the first occurrence of the hopping pattern; (iii) receive a signal from a TSCH node outside the TSCH network requesting joinder to the TSCH network; (iv) join the TSCH as a joined TSCH node; (v) assign a second guaranteed time slot to the joined TSCH node; (vi) determine the second guaranteed time slot in a second occurrence of the hopping pattern is assigned; and (vii) listen for communication from the joined TSCH node during the second guaranteed time slot.

20 Claims, 6 Drawing Sheets

(51) Int. Cl.
*H04W 74/04* (2009.01)
*H04W 84/18* (2009.01)

(52) U.S. Cl.
CPC ... *H04W 74/04* (2013.01); *H04B 2001/71563* (2013.01); *H04W 84/18* (2013.01)

(56) References Cited

U.S. PATENT DOCUMENTS

2013/0039350 A1* 2/2013 Bhatia ................. H04L 41/0846
370/336
2015/0245287 A1 8/2015 Shudark et al.

* cited by examiner

US 10,231,238 B2

FORMING A TIME SYNCHRONIZED CHANNEL HOPPING NETWORK USING GUARANTEED TIME SLOTS

CROSS REFERENCE TO RELATED APPLICATIONS

This disclosure is related to and claims the benefit of priority of U.S. Provisional Application No. 62/330,977, titled "Method for Improving Network Formation Time of a Time Synchronized Channel Hopping Network" and filed on May 3, 2016, which is hereby incorporated in its entirety by this reference.

TECHNICAL FIELD

The present disclosure relates generally to computer networking and multiplex communication. More specifically, but not by way of limitation, this disclosure relates to forming a time synchronized channel hopping network using guaranteed time slots.

BACKGROUND

A time-slotted channel hopping ("TSCH") network can be defined by IEEE 802.15.4 and provide a communications network for resource providers (e.g., utility companies, home automation providers, industrial automation providers, or scientific and environmental application providers. A TSCH network can include one or more layers of TSCH nodes. A TSCH network can also include a network coordinator for communicating with one or more layer one TSCH nodes via sequences of TSCH slot frames. The slot frames can comprise a sequence of slots (also known as time slots). A repeating hopping pattern defines a channel frequency or channel for communication on each slot, each channel corresponding to a different frequency or frequency range. The network coordinator can periodically transmit beacons (e.g., advertisement messages, solicitation messages, or enhanced beacons) to assist adjacent TSCH nodes (TSCH nodes that are within communication range of the network coordinator) in joining the TSCH network. The TSCH slot frame is defined such that only a subset of time slots (e.g., synchronization time slots) are reserved for the beacons (e.g., 10%). In order to join the TSCH network, adjacent nodes listen for the beacons transmitted by the network coordinator. However, current processes for formation of the TSCH network are inefficient, sometimes requiring multiple hours for the TSCH nodes to join and synchronize with the network coordinator.

For example, the adjacent TSCH nodes must scan through the possible TSCH channels while listening for the beacons. Since the network coordinator is periodically transmitting the beacons during a small subset of the slot frame, the chance that the adjacent TSCH node is listening on the correct channel during the transmission of the beacon is small. Many beacons transmitted by the network coordinator are never received by the adjacent TSCH nodes attempting to join the network.

SUMMARY

The present disclosure describes systems and methods for forming a time synchronized channel hopping network using guaranteed time slots.

In some aspects, a system can include one or more time-slotted channel hopping ("TSCH") nodes and a network coordinator. The network coordinator can include a processing device and a non-transitory computer-readable medium on which instructions are stored. The instructions can be executed by the processing device for causing the processing device to perform operations described in the present disclosure. The operations can include determining a first guaranteed time slot in a first occurrence of a hopping pattern is unassigned to any TSCH node of the one or more TSCH nodes in the TSCH network. The operations can include transmitting a beacon during the first guaranteed time slot in the first occurrence of the hopping pattern. The operations can include receiving a signal from a TSCH node outside the TSCH network that requests joinder to the TSCH network. The operations can include joining the TSCH node requesting joinder to the TSCH network as a joined TSCH node. The operations can include assigning a second guaranteed time slot to the joined TSCH node. The operations can include determining the second guaranteed time slot in a second occurrence of the hopping pattern is assigned to the joined TSCH node. The second occurrence of the hopping pattern can occur subsequent to the first occurrence of the hopping pattern. The operations can include listening for communication from the joined TSCH node during the second guaranteed time slot in the second occurrence of the hopping pattern.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE DRAWINGS

These and other features, aspects, and advantages of the present disclosure are better understood when the following Detailed Description is read with reference to the accompanying drawings, where.

DETAILED DESCRIPTION

Figure 1:
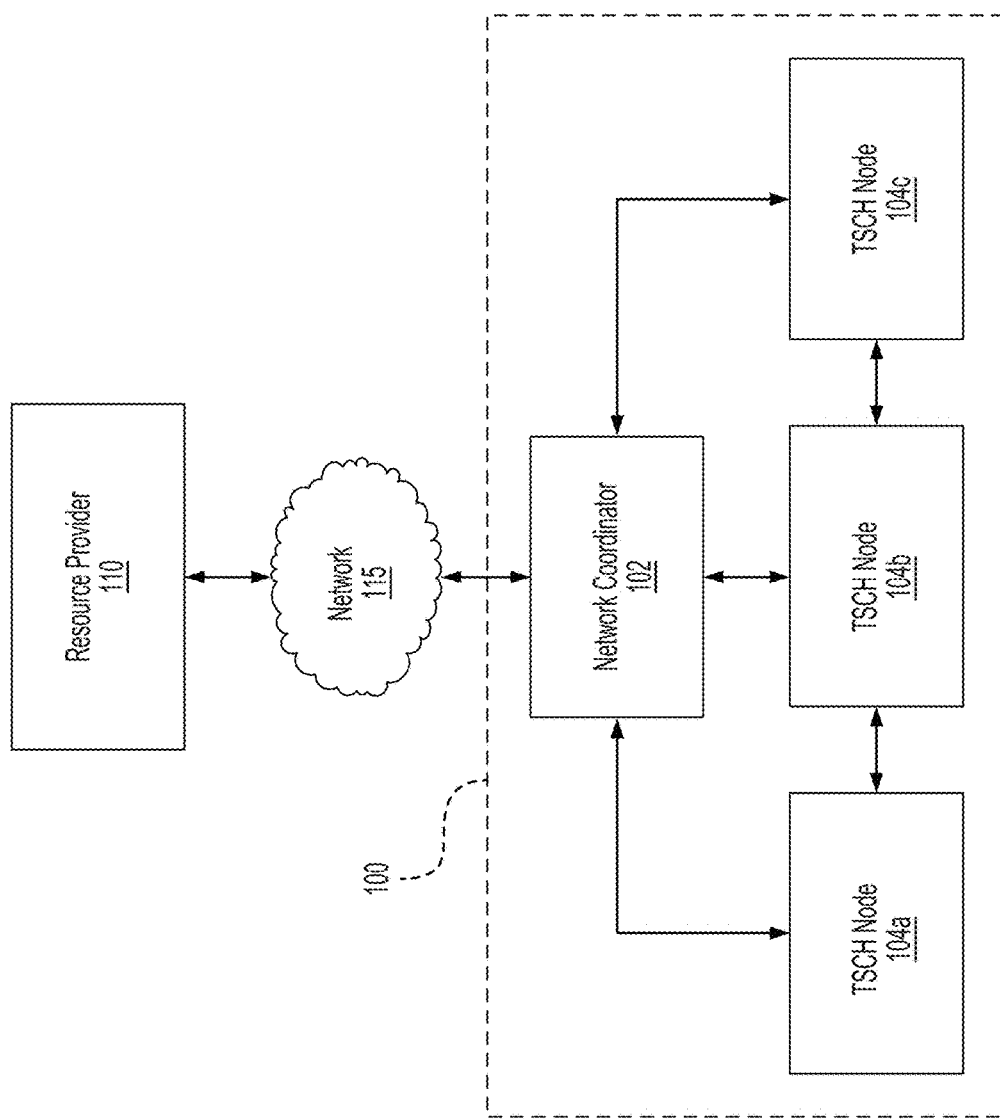
FIG. 1 is a block diagram of an example of a time-slotted channel hopping ("TSCH") network communicatively coupled to a resource provider according to one aspect of the present disclosure.

Systems and methods are provided for improving the network formation time of a time synchronized channel hopping ("TSCH") network. Utility companies and other resource providers can communicate with devices (e.g., electric meters and routers) via a TSCH network, defined by IEEE 802.15.4(e). The devices that communicate with each other via the TSCH protocol can be referred to as nodes or TSCH nodes. A TSCH network can form a wireless mesh network with multiple layers of nodes. Layer one TSCH nodes are in direct communication with the network coordinator and may facilitate communication between lower layer nodes and the network coordinator. A network coordinator can manage the TSCH network operations and maintain synchronization between layer one TSCH nodes (hereinafter referred to as "TSCH nodes"). For example, the network coordinator maintains and distributes a network communication schedule to each of the TSCH nodes, instructing the TSCH nodes when to communicate and on which frequency channel to communicate. In some examples, the network coordinator can assign each TSCH node a guaranteed time slot for dedicated communication between the network coordinator and the TSCH node. The network coordinator can also transmit beacons on unassigned guaranteed time slots. Adjacent TSCH nodes (e.g., nodes within a communication range of the network coordinator that are unconnected to the TSCH network) can connect to the TSCH network by scanning various channels for the beacon transmitted by the network coordinator. Transmitting beacons during unassigned guaranteed time slots can increase the number (or frequency) of beacons being transmitted, which can reduce the time taken for an adjacent TSCH node to connect to the TSCH network.

An adjacent TSCH node can detect the beacon and transmit a request to the network coordinator to join the TSCH network. In some examples, adjacent TSCH nodes can randomize their scanning hopping pattern based on their MAC address to prevent multiple adjacent TSCH nodes from detecting and responding to the same beacon. The network coordinator can assign or allocate the guaranteed time slot (or another unallocated guaranteed time slot) to the adjacent TSCH node after the adjacent TSCH node joins the TSCH network. So long as a guaranteed time slot is assigned to a TSCH node, the network controller will no longer transmit a beacon during that guaranteed time slot. In some aspects, a TSCH node may leave a first TSCH network to join a second TSCH network that can better serve the TSCH node. In some examples, a first network coordinator in the first TSCH network can receive an out of band message from a second network coordinator in the second network indicating that the TSCH node has moved. The first TSCH coordinator can open or unallocate the guaranteed time slot previously assigned to the TSCH node such that the guaranteed time slot can be used for transmitting beacons. In additional or alternative aspects, a network coordinator can unallocate the guaranteed time slot previously assigned to a TSCH node based on the TSCH node timing out (e.g., a period of time passing without receiving communication from the TSCH node).

The network coordinator can be assigned a predetermined number of guaranteed time slots. In some aspects, the predetermined number of guaranteed time slots can depend on the length of the TSCH epoch, which can be a predetermined time (or a predetermined number of time slots) between two sequential guaranteed time slots that are used to communicate with the same TSCH node. In additional or alternative aspects, the predetermined number of guaranteed time slots can depend on the total available number of guaranteed time slots. For example, in an 11-slot repeating slot frame with a slot duration of 25 milliseconds, every $11^{th}$ slot can be a guaranteed time slot. Transmitting beacons during unallocated guaranteed time slots can reduce the time required for forming the TSCH network.

In some aspects, transmitting beacons during unallocated guaranteed time slots can be more efficient than transmitting a beacon during a synchronization time slot and transmitting beacons during shared time slots. Synchronization time slots can include time slots that are dedicated to being used by the network coordinator for synchronizing components of a TSCH network. Shared time slots can include configurable time slots that are assigned to individual TSCH nodes by the network coordinator as either transmit slots or receive slots. Transmitting some beacons during shared time slots in the TSCH protocol can increase the number of beacons a network coordinator may transmit. The additional beacons (e.g., ancillary beacons) can be transmitted for a set number of intervals, the number of intervals and the number of beacons transmitted being configurable values of the network coordinator. But, transmitting beacons during synchronization time slot frames, as well as shared time slots for a number of intervals can be inefficient and time consuming as many beacons may be transmitted on channels that adjacent nodes are not listening on. In addition, transmission of beacons on shared time slots can take up valuable network bandwidth. Transmitting beacons during unallocated guaranteed time slots can be efficient by basing the number of beacons transmitted on the number of available guaranteed time slots. In additional or alternative aspects, transmitting beacons during unallocated guaranteed time slots can further reduce the time it takes for an adjacent TSCH node to join a TSCH network.

In some aspects, transmitting beacons during unallocated guaranteed time slots can provide a dynamic formation process in which the number of beacons transmitted can be based on the number of TSCH nodes that are connected to the TSCH network. Unlike existing TSCH networks, the disclosed TSCH network can accommodate a potentially varying number of TSCH nodes that are successfully joined to the network coordinator. Beacons transmitted during shared time slots may provide an increased number of beacons during an initialization period, but after the initialization period existing TSCH networks reduce the rate of beacons being transmitted by only transmitting beacons during a small subset of devoted synchronization time slots. The rate of beacons transmitted by the disclosed TSCH network can be based on the number of unallocated guaranteed time slots, which can be based on the number of TSCH nodes connected to the TSCH network. For example, if a number of TSCH nodes drop off the network due to a connection issue, the network coordinator can unallocate guaranteed time slots previously assigned to the TSCH nodes and transmit a beacon during the previously allocated guaranteed time slots, which can reduce the time taken by the adjacent TSCH nodes to re-join the network.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Referring now to the drawings, FIG. 1 depicts a TSCH network 100. The TSCH network 100 includes a network coordinator 102 and TSCH nodes 104a-c communicatively coupled to each other using a TSCH protocol. The TSCH network 100 can be communicatively coupled to a central system, such as a system associated with a resource provider 110 via a network 115. In some examples, the network 115 can be a wireless network (e.g., a Wi-Fi network or a cellular network), include intermediary devices, or include intranets or the internet.

The TSCH network 100 can use a TSCH protocol to communicate information within the TSCH network 100 and outside the TSCH network 100. The TSCH nodes 104a-c within the TSCH network 100 can be synchronized according to a TSCH channel hopping pattern by the network coordinator 102. The network coordinator 102 can operate according to a repeating hopping pattern that includes one or more time slots. Some of the time slots can be guaranteed time slots. The network coordinator 102 can assign each of the TSCH nodes 104a-c a guaranteed time slot and the network coordinator 102 can listen for communications from the TSCH nodes 104a-c during each assigned guaranteed time slot. During unallocated (or unassigned) guaranteed time slots, the network coordinator 102 can transmit a beacon. In some examples, the network coordinator 102 can receive a signal from an adjacent TSCH node (that is not connected to the TSCH network 100) that detected the beacon. The network coordinator 102 can perform a synchronization process to connect the adjacent TSCH node to the TSCH network 100 and allocate the unallocated guaranteed time slot to the adjacent TSCH node.

In some examples, the TSCH nodes 104a-c can be communicatively coupled to other nodes (not shown) that can be used to perform one or more applications relating to managing, monitoring, or otherwise using information regarding one or more attributes of a resource distribution system associated with the resource provider 110. In additional or alternative examples, the TSCH nodes can include intelligent metering devices for monitoring and analyzing resource consumption, a programmable thermostat for managing resource consumption, or an in-home display device for displaying information related to resource consumption and associated billing information for the resource consumption. TSCH nodes can include other Internet-Of-Things enabled devices for providing smart home capabilities in a home area network.

In some aspects, one or more of the TSCH nodes can be powered by a power source with a limited ability for sustained power usage but that can provide enough power for bursts of communication. The bursts of communication can allow the TSCH node to communicate with the TSCH network 100 for synchronization, receiver initiated transport ("RIT") command responses, unsolicited push messages, and other burst communications. TSCH nodes may also use alternative sources of low power. For example, TSCH nodes may be powered by vampire tapping power, power harvesting, and other processes where powering applications for sustained periods can be limited. The TSCH nodes can conserve energy usage by periodically shutting down or limiting power to components and cycle between a sleep state and a wake state. In some examples, the TSCH nodes can include high power components including a temperature compensated crystal oscillator ("TCXO") and transceivers.

Figure 2:
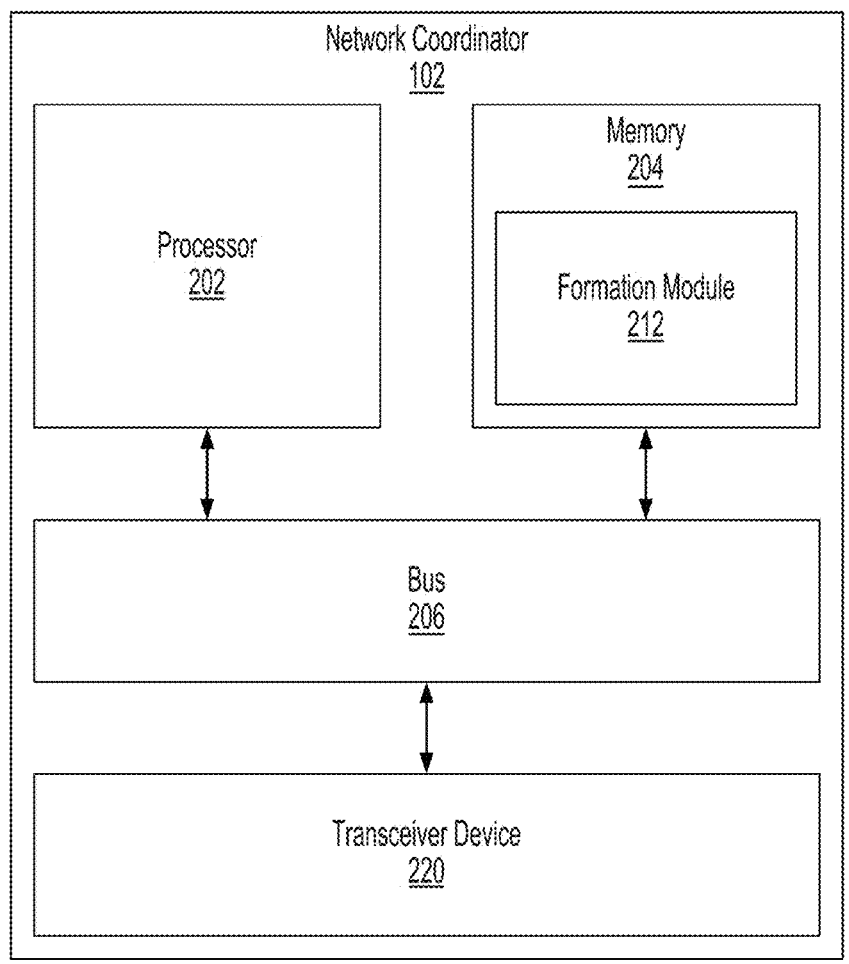
FIG. 2 is a block diagram of an example of a network controller according to one aspect of the present disclosure.

FIG. 2 depicts an example of the network coordinator 102a illustrated in FIG. 1. The network coordinator 102a includes a processor 202, memory 204, and a transceiver device 220 each communicatively coupled via a bus 206. The components of network coordinator 102a can be powered by a steady A/C power supply. The network coordinator 102a can be a part of the TSCH network 100.

The transceiver device 220 can include (or be communicatively coupled to) an antenna for communicating with TSCH nodes 104a-c in the TSCH network 100 and adjacent TSCH nodes. The transceiver device 220 can also include (or be communicatively coupled to) an antenna for communicating with the resource provider 110. In some examples, the transceiver device 220 can include a radio-frequency ("RF") transceiver and other transceivers for wirelessly transmitting and receiving signals.

In some examples, the processor 202 includes a microprocessor, an application-specific integrated circuit ("ASIC"), a state machine, a field programmable gate array ("FPGA") or another suitable processing device. The processor 202 can include any number of processing devices, including one. The processor 202 can be communicatively coupled to a non-transitory computer-readable media, such as memory 204. The processor 202 can execute computer-executable program instructions or access information stored in memory 204.

The program instructions can include a formation module 212 that is executable by the processor 202 to perform certain operations described herein. For example, the operations can include tuning the network coordinator 102. Tuning the network coordinator 102 can adjust the number of beacons that are transmitted on unallocated guaranteed time slots and/or the number of slot frames that pass between each beacon. This can allow the transmission of beacons to be adjusted depending on the requirements of the TSCH network 100. By increasing the number of beacons transmitted on unallocated guaranteed time slots, the network coordinator 102 can increase the probability that an unconnected node will receive the beacons. Similarly, by decreasing the number of slot frames between each beacon (i.e. decreasing the number of frames between each unallocated guaranteed time slot that is used to transmit a beacon), the network coordinator 102 decreases the time required for the unconnected node to receive the beacons.

In additional or alternative aspects, the operations can include adaptively adjusting the rate at which beacons are transmitted on unallocated guaranteed time slots. Specifically, the network coordinator 102 may discontinue the transmission of beacons on unallocated guaranteed time slots if certain conditions in the network are satisfied. For example, the network coordinator 102 can maintain a neighbor table in memory that contains identifiers, such as the individual MAC addresses, for each node that has communicatively coupled to the network coordinator 102. Once the number of entries in the Neighbor Table increases over a certain threshold value (e.g., over 75% full), the network coordinator 102 may reduce the number of beacons transmitted or the rate at which beacons are transmitted on unallocated guaranteed time slots. As another example, the network coordinator 102 can transmit a predetermined number of beacons (e.g., 100 beacons) on unallocated guaranteed time slots after a first TSCH node joins.

As mentioned above, as each TSCH node joins with the network coordinator 102, the network coordinator 102 can assign or allocate a guaranteed time slot to the TSCH node. The allocated guaranteed time slot (allocated to a joined TSCH node) can then be used for control and management signaling between the network coordinator 102 and the joined TSCH node, or can be used by the TSCH node for further broadcasting of beacons (i.e. allowing the TSCH node to transmit to additional nodes). As adjacent TSCH nodes join the network, the total number of available and unallocated guaranteed time slots for transmission of beacons decreases. However, if TSCH nodes disconnect from the network coordinator 102 (e.g., during a power outage), the number available and unallocated guaranteed time slots increases.

In some aspects, the network coordinator 102 can also transmit beacons on unallocated guaranteed time slot if the number of connected nodes decreases below a threshold value. For example, the network coordinator 102 can adaptively adjust the rate of transmission of beacons on unallocated guaranteed time slots according to feedback received regarding the number of nodes that are connected to the network coordinator 102a.

Memory 204 may be a computer-readable medium such as (but not limited to) an electronic, optical, magnetic, or other storage device capable of providing a processor with computer-readable instructions. Some examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Additional or alternative examples of suitable computer-programming languages include C, C++, C#, Visual Basic, Java, Python, Perl, JavaScript, and ActionScript.

Although the processor 202, memory 204, and the bus 206 are depicted in FIG. 2 as separate components in communication with one another, other implementations are possible. For example, the processor 202, memory 204, and the bus 206 can be respective components of respective printed circuit boards or other suitable devices that can be disposed in a network coordinator to store and execute programming code.

Figure 3:
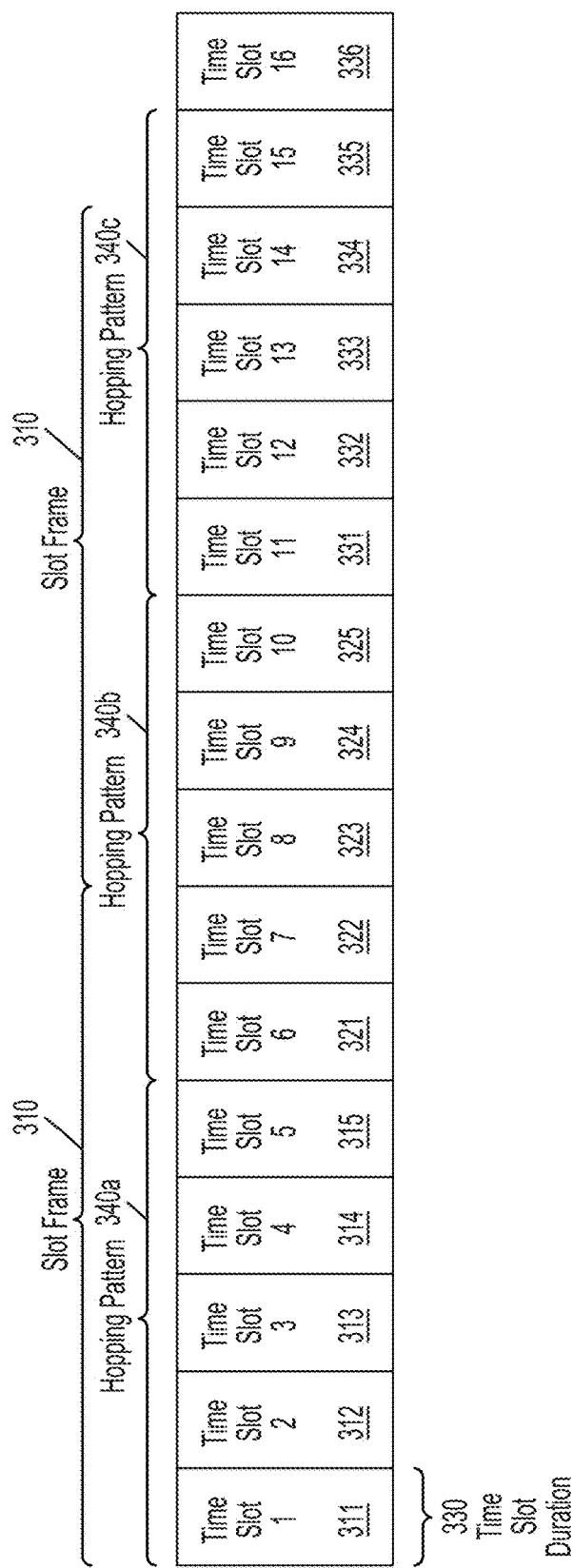
FIG. 3 is a block diagram of an example of an arrangement of time slots in a TSCH pattern according to one aspect of the present disclosure.

FIG. 3 is described below as a time-slotted channel hopping pattern for the TSCH network 100 depicted in FIG. 1, but other implementations are possible. The time-slotted channel hopping pattern includes time slots 311-315, 321-325, and 331-336, each with the same time slot duration 330. For illustrative purposes, each slot frame 310 and 320 includes seven time slots and each time slot duration 330 can be 25 milliseconds. FIG. 3 also illustrates the hopping pattern 340 (shown as channel hopping patterns 340a-c). A hopping pattern defines a channel frequency or channel for each time slot in the hopping pattern. For example, the hopping pattern 330a may be channel 4, channel 6, channel 3, channel 5, and channel 7. The hopping pattern may associate channel 4 with time slot 1, channel 6 with time slot 2, channel 3 with time slot 3, channel 5 with time slot 4, and channel 7 with time slot 5. In FIG. 3, the hopping pattern 340a has a hopping pattern length of 5 and repeats. The first illustrated iteration of the hopping pattern 340a contains time slots 1-5 (311-315), the second iteration of the hopping pattern 340b contains time slots 6-10 (321-325), and the third iteration of the hopping pattern 340c contains time slots 11-15 (331-336). The number of time slots in a hopping pattern can be independent of the number of time slots in a slot frame.

In some aspects, a portion of the time slots 311-315, 321-325, 331-336 in each hopping pattern 340a-c can be guaranteed time slots. A guaranteed time slot can be a time slot reserved for communication between the network coordinator 102 and an assigned device (e.g., one of the TSCH nodes 104a-c). Some of the guaranteed time slots may be unallocated. For example, time slots 1-4, 6-9, and 11-14 (311-314, 321-324, 331-334) may be guaranteed time slots. Time slots 1-3, 6-7, and 11-13 (311-313, 321-323, 331-333) may be guaranteed time slots assigned to TSCH nodes 104a-c respectively. Time slots 4, 7, and 14 (314, 324, 334) may be unassigned or unallocated guaranteed time slots and the network coordinator may transmit a beacon during one or more of them.

Figure 4:
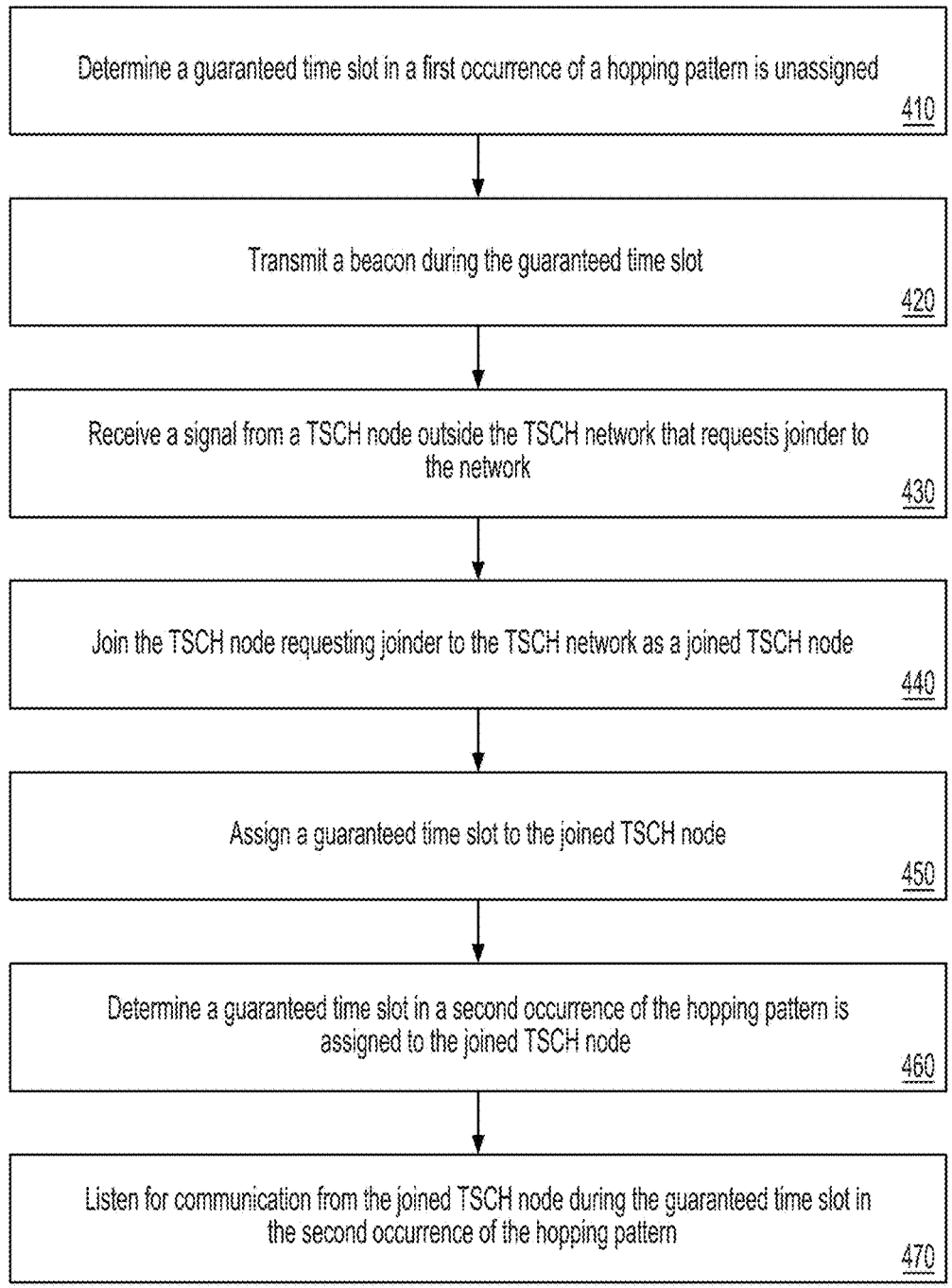
FIG. 4 is a flowchart of an example process forming a TSCH network using guaranteed time slots according to one aspect of the present disclosure.

FIG. 4 is a flow chart of an example of a process for forming a TSCH network using guaranteed time slots. FIG. 4 is described below in regards to the TSCH network 100 depicted in FIG. 1, but the process may be used to form other TSCH networks.

In block 410, the network coordinator 102 determines a guaranteed time slot in a first occurrence of a hopping pattern is unassigned. In some examples, the network coordinator 102 can query a database of connected TSCH nodes 104a-c to determine if any of the TSCH nodes 104a-c have been assigned the guaranteed time slot. In additional or alternative examples, the network coordinator 102 can store the hopping pattern in memory along with information related to each time slot in the hopping pattern. The information can include a designation (e.g., guaranteed time slot, synchronization time slot, or shared time slot) and an allocation (e.g., an assignment of the time slot for use in communicating with a component of the TSCH network 100).

In block 420, the network coordinator 102 transmits a beacon during the guaranteed time slot. The network coordinator 102 can include a transceiver device 220 for transmitting the beacon. The beacon can be a wireless signal that includes information for joining the TSCH network 100. In some examples, the network coordinator 102 can transmit the beacon during the guaranteed time slot based on a determination that the guaranteed time slot is unassigned or unallocated. In additional or alternative examples, the network coordinator 102 can transmit the beacon during the guaranteed time slot based on the number of elapsed time slots (e.g., a number of unallocated guaranteed time slots) since the network coordinator 102 transmitted a beacon exceeding a threshold value. The threshold value can be determined such that an adjacent TSCH node has a predetermined probability (e.g., 80%) of receiving a beacon from the network coordinator during a predetermined period of time.

In block 430, the network coordinator 102 receives a signal from an adjacent TSCH node requesting joinder to the TSCH network as a joined TSCH node. In some aspects, the network coordinator 102 can receive the signal in response to the adjacent TSCH node detecting the beacon. In some examples, the adjacent TSCH node can be an adjacent TSCH node that has never joined the TSCH network 100. In additional or alternative examples, the adjacent TSCH node can be an adjacent TSCH node that disconnected from the TSCH network 100 and is seeking to rejoin the TSCH network 100. The network coordinator 102 can receive the signal via the transceiver device 220 during the guaranteed time slot or during a subsequent time slot.

In block 440, the network coordinator 102 joins the adjacent TSCH node to the TSCH network 100 as a joined TSCH node (e.g., a layer one node). In some examples, the network coordinator 102 begins communicating with the TSCH node to synchronize the TSCH node with the TSCH network 100. In additional or alternative examples, the network coordinator 102 communicates information included in the signal received by the network coordinator 102 to other TSCH nodes 104a-c connected to the TSCH network 100 such that the TSCH nodes 104a-c can communicate directly with the joined TSCH node.

In block 450, the network coordinator 102 assigns a guaranteed time slot to the joined TSCH node. In some examples, the network coordinator 102 can assign the guaranteed time slot used to transmit the beacon to the adjacent TSCH node. In additional or alternative examples, the network coordinator 102 can assign another unallocated guaranteed time slot in the hopping pattern to the joined TSCH node. In some aspects, to assign the guaranteed time slot, the network coordinator 102 can update information on the hopping pattern stored in memory.

In block 460, the network coordinator 102 determines a guaranteed time slot in a second occurrence of the hopping pattern is assigned to the joined TSCH node. The second occurrence of the hopping pattern can occur after the first occurrence of the hopping pattern and after the joined TSCH node has joined the TSCH network 100. In block 470, the network coordinator 102 listens for communication from the joined TSCH node during the guaranteed time slot assigned to the joined TSCH node in the second occurrence of the hopping pattern.

In some aspects, the rate at which the network coordinator 102 transmits the beacons on unallocated guaranteed time slots is tunable in order to control the speed at which adjacent TSCH nodes are able to join the TSCH network 100. For example, the network coordinator 102 can be tuned to transmit beacons every other unallocated guaranteed time slot for a faster network join time or transmit beacons every 20 or 30 unallocated guaranteed time slots for a slower network join time.

The frequency of the transmission of beacons on unallocated guaranteed time slots can be adjusted such that the network coordinator 102 can expect, to a P % probability, that an adjacent TSCH node receives a beacon within a T amount of time (P and T being any desired values). For example, the following equation indicates a probability that a beacon will be received by a TSCH node, depending on the number of channels in the TSCH hopping sequence and the number of beacons transmitted in the Epoch.

$$\text{Probability} = 1 - \left(1 - \frac{1}{numChannels}\right)^{numEBs}$$

Figure 5:
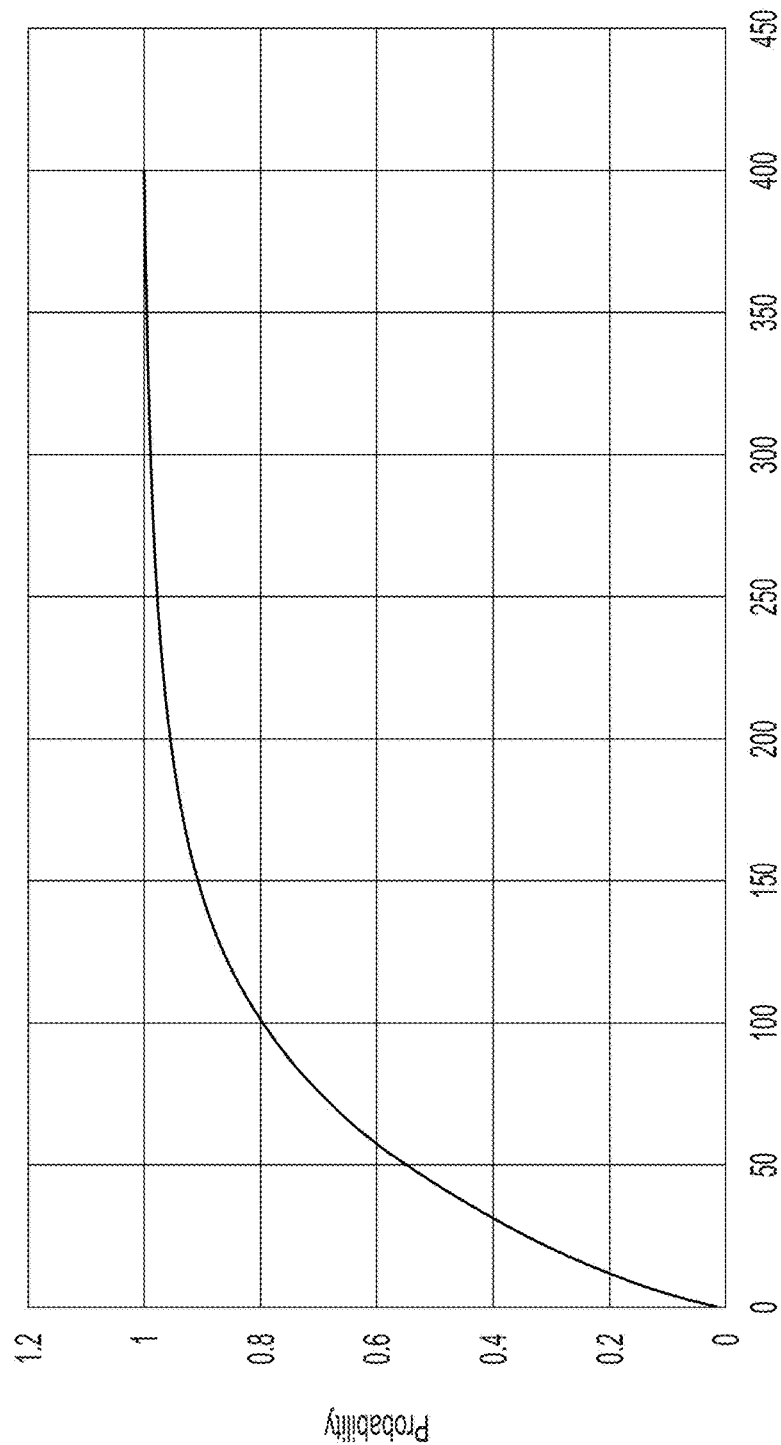
FIG. 5 is a diagram of an example of a graph illustrating the probability adjacent nodes receive beacons transmitted from the network coordinator via the unallocated guaranteed time slots according to one aspect of the present disclosure.

Assuming, for example, 64 channels in the TSCH network, FIG. 5 plots the probability that an adjacent node receives a beacon transmitted from the network coordinator 102 via the unallocated guaranteed time slots. As shown in FIG. 5, the network coordinator 102 can expect that the adjacent node will receive a beacon (and can be successfully joined or be in the process of joining) the network to an 80% certainty if a minimum of 100 beacons are transmitted.

The following equation calculates the time in minutes in which an adjacent node will receive, to a P % probability, a beacon. The time required is a function of the slots per slot frame (noted as SlotsPerSlotFrame), the duration of the slot (shown as SlotDurations), the slot frames that pass per beacon (noted as SlotFramePerEB), and the number of beacons transmitted per Epoch (shown as numEBs):

$$Time\, in\, minutes = \frac{numEBs * SlotsPerSlotframe * SlotDuration * SlotframePerEB}{60 \frac{s}{m}}$$

As an example, if the slots per slot frame are 11 (i.e. 11 slots per frame) and the slot duration is 25 milliseconds, the equation reduces to:

$$Time\, in\, minutes = \frac{numEBs * 0.275\, s * SlotframePerEB}{60}$$

As shown from the first equation above, the network coordinator can expect that adjacent nodes will receive a beacon to an 80% certainty if 100 beacons are transmitted in the Epoch. Using this information, the time in minutes in which beacons are received by adjacent nodes, at an 80% probability (assuming the constants noted above), is:

$$Time\, in\, minutes = \frac{11}{24} SlotframePerEB$$

Figure 6:
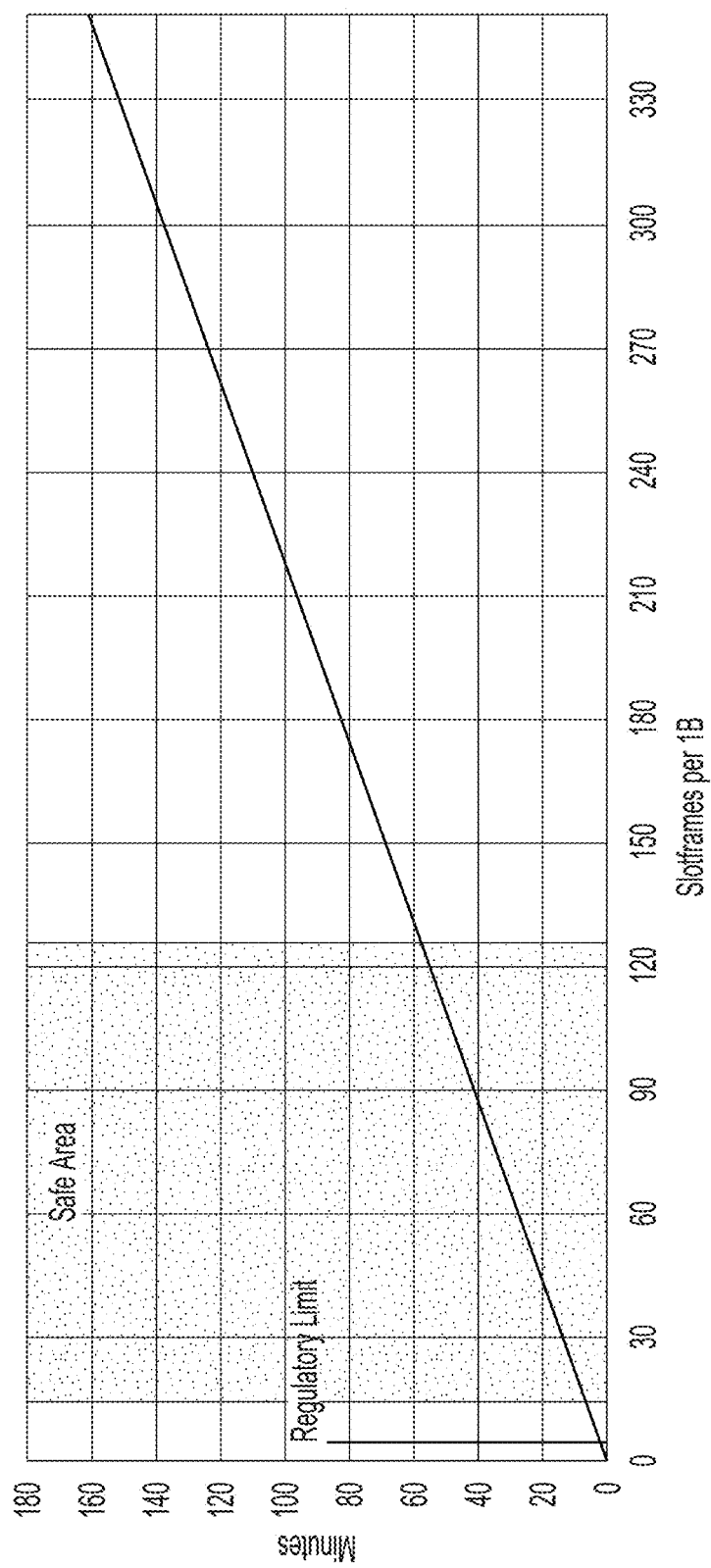
FIG. 6 is a diagram of an example of a graph depicting the amount of time in minutes to reach 80% probability as a function of the number of time slots between each beacon according to one aspect of the present disclosure.

Given the constants for slots per frame and duration of the slots, the time in minutes to reach 80% probability that an adjacent TSCH node has received the beacons is a function of the number of slot frames that pass between each transmitted beacon. FIG. 6 is a graph depicting the amount of time in minutes to reach an 80% probability that a TSCH node has received a beacon as a function of the number of slot frames between each beacon. The number of slot frames between each beacon or a rate of transmission of the beacons can be set based on optimizing between a speed of forming a network and an amount of traffic on the network. In some aspects, the number of slot frames can be set to meet various regulatory limitations (e.g., the Federal Communications Commission's limitations). These regulatory limitations can limit a dwell time and a duty cycle of a TSCH network.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof can be apparent to those skilled in the art without departing from the scope of this invention. The illustrative examples described above are given to introduce the reader to the general subject matter discussed here and are not intended to limit the scope of the disclosed concepts.

What is claimed is:
1. A network coordinator in a time-slotted channel hopping ("TSCH") network comprising:
a processing device; and
a non-transitory computer-readable medium on which instructions are stored for causing the processing device to:
determine a first guaranteed time slot in a first occurrence of a hopping pattern is unassigned to any TSCH node of a plurality of TSCH nodes in the TSCH network;
transmit a beacon during the first guaranteed time slot in the first occurrence of the hopping pattern;
receive a signal from a TSCH node outside the TSCH network that requests joinder to the TSCH network;
join the TSCH node requesting the joinder to the TSCH network as a joined TSCH node;
assign a second guaranteed time slot to the joined TSCH node;
determine the second guaranteed time slot in a second occurrence of the hopping pattern is assigned to the joined TSCH node, the second occurrence of the hopping pattern occurring subsequent to the first occurrence of the hopping pattern; and listen for communication from the joined TSCH node during the second guaranteed time slot in the second occurrence of the hopping pattern.

2. The network coordinator of claim 1, wherein the non-transitory computer-readable medium further comprises instructions executable by the processing device for causing the processing device to transmit a second beacon during a synchronization time slot of the first occurrence of the hopping pattern, the synchronization time slot being separate from the first guaranteed time slot, and the synchronization time slot being a dedicated time slot of the hopping pattern for synchronizing the TSCH nodes with the TSCH network.

3. The network coordinator of claim 1, wherein the non-transitory computer-readable medium further comprises instructions executable by the processing device for causing the processing device to transmit a second beacon during a shared time slot of the first occurrence of the hopping pattern, the shared time slot being separate from the first guaranteed time slot and the second beacon being usable for synchronizing TSCH nodes during an initialization period.

4. The network coordinator of claim 1, wherein the instructions for causing the processing device to transmit the beacon during the first guaranteed time slot comprises instructions for causing the processing device to transmit the beacon during the first guaranteed time slot in response to a number of elapsed guaranteed time slots since the network coordinator transmitted a previous beacon exceeding a threshold value.

5. The network coordinator of claim 4, wherein the threshold value is based on the number of guaranteed time slots in the first occurrence of the hopping pattern that are unassigned.

6. The network coordinator of claim 4, wherein the instructions for causing the processing device to transmit the beacon during the first guaranteed time slot comprises instructions for causing the processing device to:
determine a beacon transmission rate such that a probability that the TSCH node outside the TSCH network detects a beacon within a predetermined period of time is above a predetermined probability; and
determine the threshold value based on the beacon transmission rate.

7. The network coordinator of claim 1, the non-transitory computer-readable medium further comprising instructions executable by the processing device for causing the processing device to:
determine the joined TSCH node is no longer joined to the TSCH network;
unassign the second guaranteed time slot from the TSCH node that is no longer joined to the TSCH network; and
during a third guaranteed time slot in a third occurrence of the hopping pattern, transmit a beacon, wherein the third occurrence of the hopping pattern occurs subsequent to the second occurrence of the hopping pattern, and the third guaranteed time slot occurs at a same position within the hopping pattern as the second guaranteed time slot.

8. A method for forming a time-slotted channel hopping ("TSCH") network comprising:
determining a first guaranteed time slot in a first occurrence of a hopping pattern is unassigned to any TSCH node of a plurality of TSCH nodes in the TSCH network;
transmitting a beacon during the first guaranteed time slot in the first occurrence of the hopping pattern;
receiving a signal from a TSCH node outside the TSCH network that requests joinder to the TSCH network;
joining the TSCH node requesting the joinder to the TSCH network as a joined TSCH node;
assigning a second guaranteed time slot to the joined TSCH node;
determining the second guaranteed time slot in a second occurrence of the hopping pattern is assigned to the joined TSCH node, the second occurrence of the hopping pattern occurring subsequent to the first occurrence of the hopping pattern; and
listening for communication from the joined TSCH node during the second guaranteed time slot in the second occurrence of the hopping pattern.

9. The method of claim 8, further comprising transmitting a second beacon during a synchronization time slot of the first occurrence of the hopping pattern, the synchronization time slot being separate from the first guaranteed time slot, and the synchronization time slot being a dedicated time slot of the hopping pattern for synchronizing the TSCH nodes with the TSCH network.

10. The method of claim 8, further comprising transmitting a second beacon during a shared time slot of the first occurrence of the hopping pattern, the shared time slot being separate from the first guaranteed time slot and the second beacon being usable for synchronizing TSCH nodes during an initialization period.

11. The method of claim 8, wherein transmitting the beacon during the first guaranteed time slot comprises transmitting the beacon during the first guaranteed time slot in response to a number of elapsed guaranteed time slots since the network coordinator transmitted a previous beacon exceeding a threshold value.

12. The method of claim 11, wherein the threshold value is based on the number of guaranteed time slots in the first occurrence of the hopping pattern that are unassigned.

13. The method of claim 11, wherein transmitting the beacon during the first guaranteed time slot comprises:
determining a beacon transmission rate such that a probability that the TSCH node outside the TSCH network detects a beacon within a predetermined period of time is above a predetermined probability; and
determining the threshold value based on the beacon transmission rate.

14. The method of claim 8, further comprising:
determining the joined TSCH node is no longer joined to the TSCH network;
unassigning the second guaranteed time slot from the TSCH node that is no longer joined to the TSCH network; and
transmitting, during a third guaranteed time slot in a third occurrence of the hopping pattern, a beacon, wherein the third occurrence of the hopping pattern occurs subsequent to the second occurrence of the hopping pattern, and the third guaranteed time slot occurs at a same position within the hopping pattern as the second guaranteed time slot.

15. A system comprising:
one or more time-slotted channel hopping ("TSCH") nodes communicatively coupleable to each other in a TSCH network; and
a network coordinator comprising:
a processing device; and
a non-transitory computer-readable medium on which instructions are stored for causing the processing device to:

determine a first guaranteed time slot in a first occurrence of a hopping pattern is unassigned to any TSCH node of the one or more TSCH nodes in the TSCH network;

transmit a beacon during the first guaranteed time slot in the first occurrence of the hopping pattern;

receive a signal from a TSCH node outside the TSCH network that requests joinder to the TSCH network;

join the TSCH node requesting the joinder to the TSCH network as a joined TSCH node;

assign a second guaranteed time slot to the joined TSCH node;

determine the second guaranteed time slot in a second occurrence of the hopping pattern is assigned to the joined TSCH node, the second occurrence of the hopping pattern occurring subsequent to the first occurrence of the hopping pattern; and listen for communication from the joined TSCH node during the second guaranteed time slot in the second occurrence of the hopping pattern.

16. The system of claim 15, wherein the non-transitory computer-readable medium further comprises instructions executable by the processing device for causing the processing device to transmit a second beacon during a synchronization time slot of the first occurrence of the hopping pattern, the synchronization time slot being separate from the first guaranteed time slot, and the synchronization time slot being a dedicated time slot of the hopping pattern for synchronizing the TSCH nodes with the TSCH network.

17. The system of claim 15, wherein the non-transitory computer-readable medium further comprises instructions executable by the processing device for causing the processing device to transmit a second beacon during a shared time slot of the first occurrence of the hopping pattern, the shared time slot being separate from the first guaranteed time slot and the second beacon being usable for synchronizing TSCH nodes during an initialization period.

18. The system of claim 15, wherein the instructions for causing the processing device to transmit the beacon during the first guaranteed time slot comprises instructions for causing the processing device to transmit the beacon during the first guaranteed time slot in response to a number of elapsed guaranteed time slots since the network coordinator transmitted a previous beacon exceeding a threshold value.

19. The system of claim 18, wherein the threshold value is based on the number of guaranteed time slots in the first occurrence of the hopping pattern that are unassigned.

20. The system of claim 15, the non-transitory computer-readable medium further comprising instructions executable by the processing device for causing the processing device to:

determine the joined TSCH node is no longer joined to the TSCH network;

unassign the second guaranteed time slot from the TSCH node that is no longer joined to the TSCH network; and during a third guaranteed time slot in a third occurrence of the hopping pattern, transmit a beacon, wherein the third occurrence of the hopping pattern occurs subsequent to the second occurrence of the hopping pattern, and the third guaranteed time slot occurs at a same position within the hopping pattern as the second guaranteed time slot.

\* \* \* \* \*